(12) United States Patent
Cordes et al.

(10) Patent No.: US 9,591,434 B1
(45) Date of Patent: Mar. 7, 2017

(54) VIRTUAL PRIVATE NETWORK (VPN) TUNNELING IN A USER EQUIPMENT (UE) BROKERED BY A RADIO FREQUENCY IDENTITY (RFID) CHIP COMMUNICATIVELY COUPLED TO THE USER EQUIPMENT

(71) Applicant: Sprint Communications Company L.P., Overland Park, KS (US)

(72) Inventors: Kevin R. Cordes, Lee's Summit, MO (US); Clint H. Loman, Raymore, MO (US); Lyle W. Paczkowski, Mission Hills, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 105 days.

(21) Appl. No.: 14/696,835

(22) Filed: Apr. 27, 2015

(51) Int. Cl.
*H04B 7/00* (2006.01)
*H04W 4/00* (2009.01)
*H04W 12/06* (2009.01)
*H04L 29/06* (2006.01)

(52) U.S. Cl.
CPC ......... *H04W 4/008* (2013.01); *H04L 63/0272* (2013.01); *H04W 12/06* (2013.01)

(58) Field of Classification Search
CPC ....... H04W 4/02; H04W 4/008; H04W 12/06; H04L 63/0272
USPC .............. 455/41.2, 556.1, 127.2, 41.1, 550.1
See application file for complete search history.

(56) References Cited

U.S. PATENT DOCUMENTS

| | | | |
|---|---|---|---|
| 6,177,860 B1 | 1/2001 | Cromer et al. | |
| 6,726,099 B2 * | 4/2004 | Becker | G06K 7/0008 235/380 |
| 6,842,106 B2 * | 1/2005 | Hughes | G06F 21/31 340/10.1 |
| 7,245,213 B1 | 7/2007 | Esterberg et al. | |
| 7,339,476 B2 * | 3/2008 | Macurek | G05B 19/4183 235/462.01 |
| 7,366,806 B2 * | 4/2008 | Milenkovic | G06F 21/88 340/10.51 |
| 7,450,010 B1 | 11/2008 | Gravelle et al. | |

(Continued)

OTHER PUBLICATIONS

Office Action dated Nov. 19, 2015, U.S. Appl. No. 13/857,139, filed Apr. 4, 2013.

(Continued)

*Primary Examiner* — Marceau Milord

(57) ABSTRACT

A user equipment (UE). The UE comprises a motherboard comprising a communication bus, a cellular radio frequency transceiver, a processor, a radio frequency identity (RFID) chip, and a memory storing an application. The RFID chip is connected to the communication bus and comprises an RFID near field communication (NFC) transceiver, an RFID internal processor, an RFID internal memory, and an RFID application. When executed by the processor, the application receives a request from the RFID chip to establish a virtual private network (VPN) tunnel via the cellular radio frequency transceiver based on information encapsulated in the request. The RFID application, when executed by the RFID internal processor, receives a message from an NFC device comprising a command to open the VPN tunnel and sends the request to establish the VPN tunnel to the application executed on the processor.

19 Claims, 7 Drawing Sheets

(56) References Cited

U.S. PATENT DOCUMENTS

| | | | |
|---|---|---|---|
| 7,834,743 B2 | 11/2010 | Nagata et al. | |
| 7,924,156 B2* | 4/2011 | Colby | G06K 19/0723 |
| | | | 235/380 |
| 8,138,922 B2 | 3/2012 | Lindsay et al. | |
| 8,174,384 B2 | 5/2012 | Stagg | |
| 8,217,793 B2 | 7/2012 | Broer | |
| 8,244,179 B2* | 8/2012 | Dua | G06F 17/30058 |
| | | | 340/10.51 |
| 8,311,509 B2 | 11/2012 | Feher | |
| 8,471,708 B1 | 6/2013 | Diorio et al. | |
| 8,487,769 B2 | 7/2013 | Lindsay et al. | |
| 8,718,554 B2 | 5/2014 | Abel | |
| 8,752,127 B2* | 6/2014 | Musfeldt | H04L 9/3234 |
| | | | 713/168 |
| 8,797,144 B2 | 8/2014 | Hinman et al. | |
| 8,811,971 B2* | 8/2014 | Corda | G06F 21/79 |
| | | | 380/274 |
| 8,816,826 B2* | 8/2014 | Colby | G06K 19/025 |
| | | | 340/10.34 |
| 8,866,594 B1 | 10/2014 | Diorio et al. | |
| 9,087,318 B1* | 7/2015 | Cordes | G06Q 10/0875 |
| 9,111,280 B2* | 8/2015 | Sloan | G06Q 30/00 |
| 9,161,325 B1* | 10/2015 | Urbanek | H04W 4/001 |
| 9,171,243 B1* | 10/2015 | Cordes | G06K 19/07309 |
| 9,191,522 B1* | 11/2015 | Krieger | H04W 4/24 |
| 9,226,145 B1* | 12/2015 | Loman | H04W 12/12 |
| 9,230,085 B1* | 1/2016 | Paczkowski | G06F 21/57 |
| 9,253,589 B2 | 2/2016 | McCann et al. | |
| 9,286,594 B1 | 3/2016 | Cordes et al. | |
| 9,324,016 B1 | 4/2016 | Cordes et al. | |
| 9,331,996 B2* | 5/2016 | Musfeldt | H04L 63/08 |
| 9,384,498 B1* | 7/2016 | Bertz | G06Q 30/0633 |
| 9,396,424 B1* | 7/2016 | Loman | G06K 19/0712 |
| 9,398,428 B2* | 7/2016 | Steinbach | H04W 4/12 |
| 9,426,604 B1 | 8/2016 | Cordes et al. | |
| 9,432,364 B2* | 8/2016 | Lee | G06Q 30/04 |
| 9,454,723 B1 | 9/2016 | Cordes et al. | |
| 9,460,573 B1 | 10/2016 | Cordes et al. | |
| 2005/0045719 A1 | 3/2005 | Yang | |
| 2005/0123596 A1 | 6/2005 | Kohane et al. | |
| 2005/0125396 A1 | 6/2005 | Liu | |
| 2006/0258289 A1 | 11/2006 | Dua | |
| 2007/0035381 A1 | 2/2007 | Davis | |
| 2007/0069852 A1 | 3/2007 | Mo et al. | |
| 2007/0075140 A1 | 4/2007 | Guez et al. | |
| 2008/0051142 A1 | 2/2008 | Calvet et al. | |
| 2008/0198098 A1 | 8/2008 | Gelbman et al. | |
| 2008/0232259 A1 | 9/2008 | Thomson | |
| 2008/0303637 A1 | 12/2008 | Gelbman et al. | |
| 2009/0164800 A1 | 6/2009 | Johansson et al. | |
| 2009/0227290 A1 | 9/2009 | Chien | |
| 2010/0075669 A1 | 3/2010 | Sparks et al. | |
| 2011/0063093 A1 | 3/2011 | Fung et al. | |
| 2011/0254687 A1 | 10/2011 | Arponen et al. | |
| 2012/0077468 A1* | 3/2012 | Fan | G07C 9/00309 |
| | | | 455/414.1 |
| 2012/0079100 A1 | 3/2012 | McIntyre et al. | |
| 2012/0149338 A1 | 6/2012 | Roundtree | |
| 2012/0150601 A1 | 6/2012 | Fisher | |
| 2012/0184367 A1 | 7/2012 | Parrott et al. | |
| 2012/0196586 A1 | 8/2012 | Grigg et al. | |
| 2012/0238206 A1* | 9/2012 | Singh | H04L 63/0492 |
| | | | 455/41.1 |
| 2012/0262281 A1 | 10/2012 | Edwards et al. | |
| 2013/0105565 A1 | 5/2013 | Kamprath | |
| 2013/0175984 A1 | 7/2013 | Yamazaki et al. | |
| 2014/0141718 A1 | 5/2014 | Stromberg et al. | |
| 2015/0019444 A1* | 1/2015 | Purves | G06Q 20/382 |
| | | | 705/76 |

OTHER PUBLICATIONS

Office Action dated Nov. 2, 2015, U.S. Appl. No. 13/873,813, filed Apr. 30, 2013.
Notice of Allowance dated Oct. 29, 2015, U.S. Appl. No. 14/732,846, filed Jun. 8, 2015.
Notice of Allowance dated Mar. 26, 2016, U.S. Appl. No. 13/857,139 filed Apr. 4, 2013.
Notice of Allowance dated Apr. 22, 2016, U.S. Appl. No. 13/873,813, filed Apr. 30, 2013.
Notice of Allowance dated Jun. 1, 2016, U.S. Appl. No. 14/192,316, filed Feb. 27, 2014.
Notice of Allowance dated Mar. 24, 2016, U.S. Appl. No. 14/532,954, filed Nov. 4, 2014.
Notice of Allowance dated Dec. 17, 2015, U.S. Appl. No. 13/857,141, filed Apr. 4, 2013.
FAIPP Pre-Interview Communication dated Feb. 25, 2016, U.S. Appl. No. 14/192,316, filed Feb. 27, 2014.
FAIPP Pre-Interview Communication dated Dec. 30, 2015, U.S. Appl. No. 14/532,954, filed Nov. 4, 2014.
Cordes, Kevin R., et al., "Digest of Biographical Information for an Electronic Device with Static and Dynamic Portions," filed Mar. 14, 2016, U.S. Appl. No. 15/069,921.
FAIPP Pre-Interview Communication dated Aug. 5, 2015, U.S. Appl. No. 13/857,141, filed Apr. 4, 2013.
FAIPP Pre-Interview Communication dated Jun. 2, 2015, U.S. Appl. No. 13/857,139 filed Apr. 4, 2013.
Notice of Allowance dated Jun. 11, 2015, U.S. Appl. No. 13/857,138, filed Apr. 4, 2013.
Restriction Requirement dated Jul. 31, 2015, U.S. Appl. No. 13/873,813, filed Apr. 30, 2013.
Office Action dated Jul. 9, 2015, U.S. Appl. No. 14/732,846, filed Jun. 8, 2015.
Cordes, Kevin R., et al., "Visually Readable Electronic Label," filed Jun. 8, 2015, U.S. Appl. No. 14/732,846.
Cordes, Kevin R., et al., "Prevention of Inductive Coupling Between Components of a Mobile Communication Device ," filed Jul. 8, 2016, U.S. Appl. No. 15/206,002.
Restriction Requirement dated Jan. 5, 2015, U.S. Appl. No. 13/857,139, filed Apr. 4, 2013.
FAIPP Pre-Interview Communication dated Mar. 2, 2015, U.S. Appl. No. 13/857,138, filed Apr. 4, 2013.
First Action Interview Office Action dated Apr. 20, 2015, U.S. Appl. No. 13/857,138, filed Apr. 4, 2013.
Notice of Allowance dated Mar. 6, 2015, U.S. Appl. No. 14/076,164, filed Nov. 8, 2013.
Cordes, Kevin R., et al., "Digest of Biographical Information for an Electronic Device with Static and Dynamic Portions," filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device," filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device," filed Apr. 4, 2013, U.S. Appl. No. 13/857,138.
Cordes, Kevin R., et al., "Prevention of Inductive Coupling Between Components of a Mobile Communication Device ," filed Apr. 30, 2013, U.S. Appl. No. 13/873,813.
Cordes, Kevin R., et al., "Visually Readable Electronic Label," filed Nov. 8, 2013, U.S. Appl. No. 14/076,164.
Cordes, Kevin R., et al., "Autonomous Authentication of a Reader by a Radio Frequency Identity (RFID) Device," filed Feb. 27, 2014, U.S. Appl. No. 14/192,316.
Loman, Clint H., et al., "Radio Frequency Induced Power Reception Management for a Radio Frequency Identity (RFID) Chip Embedded in a Mobile Communication Device," filed Nov. 4, 2014, U.S. Appl. No. 14/532,954.
Office Action dated Nov. 4, 2014, U.S. Appl. No. 14/076,164, filed Nov. 8, 2013.

(56) References Cited

OTHER PUBLICATIONS

FAIPP Pre-Interview Communication dated Oct. 5, 2016, U.S. Appl. No. 15/069,921, filed Mar. 14, 2016.

* cited by examiner

000
VIRTUAL PRIVATE NETWORK (VPN) TUNNELING IN A USER EQUIPMENT (UE) BROKERED BY A RADIO FREQUENCY IDENTITY (RFID) CHIP COMMUNICATIVELY COUPLED TO THE USER EQUIPMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User equipments (UEs), for example mobile phones, are used for a wide variety of purposes in addition to making voice calls. A variety of computer applications may execute on UEs providing gaming, navigation, search, media, and news services to the user of the UE. UEs may be used as working tools by technicians and workmen. Functionality and/or applications on UEs may be integrated with server applications that execute remotely from the UE.

SUMMARY

In an embodiment, a user equipment (UE) is disclosed. The UE comprises a motherboard comprising a communication bus, a cellular radio frequency transceiver connected to the communication bus of the motherboard, a processor connected to the communication bus of the motherboard, a radio frequency identity (RFID) chip connected to the communication bus of the motherboard, a memory connected to the communication bus of the motherboard, and an application stored in the memory. The RFID chip comprises an RFID near field communication (NFC) transceiver, an RFID internal processor, an RFID internal memory, and an RFID application stored in the RFID internal memory, wherein the RFID chip provides wireless read access to the RFID internal memory and provides write access to the RFID internal memory to the communication bus of the motherboard. When executed by the processor, the application receives a request from the RFID chip to establish a virtual private network (VPN) tunnel via the cellular radio frequency transceiver based on information encapsulated in the request. The RFID application, when executed by the RFID internal processor, receives a message from an NFC device via the RFID NFC transceiver, wherein the message comprises a command to open the VPN tunnel and, responsive to receiving the message from the NFC device, sends the request to establish the VPN tunnel to the application executed on the processor.

In another embodiment, a method of servicing a consumer electronic device is disclosed. The method comprises receiving a near field communication (NFC) message from a mobile communication device, by a radio frequency identity (RFID) chip coupled to a motherboard of the consumer electronic device and, responsive to receiving the NFC message, sending by the RFID chip a request to a communication transceiver coupled to the motherboard to establish a virtual private network tunnel over an Internet to a cloud computing service. The method further comprises, responsive to the request from the RFID chip, establishing by the communication transceiver the VPN tunnel over the Internet to the cloud computing service and transmitting by the communication transceiver consumer electronic device information to the cloud computing service via the VPN tunnel, wherein the device information comprises an identity of the device, user settings of the device, and current state of the device, whereby the consumer electronic device information is made available to the mobile communication device via the cloud computing service for use by a technician to maintain the consumer electronic device.

In yet another embodiment, a memory device is disclosed. The memory device comprises a memory media, a communication bus, an memory reader communicatively coupled to a communication bus, and a radio frequency transceiver coupled to the communication bus. The memory device further comprises a radio frequency identity (RFID) chip coupled to the communication bus and a processor coupled to the communication bus. The RFID chip comprises an RFID near field communication (NFC) transceiver, an RFID internal processor, an RFID internal memory, and an RFID application stored in the RFID local memory, wherein the RFID internal memory stores an identity of a paired computing device. The processor is operable to receive a request to read data from the memory media from the radio frequency transceiver, to request authorization from the RFID chip, to read data from the memory media via the memory reader, and to transmit the read data via the radio frequency transceiver. When executed by the internal processor, the RFID application receives an identity from an external device, compares the identity of the external device to the identity of the paired computing device stored in the RFID internal memory, and responsive to agreement between the identity of the external device and the identity of the paired computing device stored in the RFID internal memory and responsive to the authorization request from the processor sends authorization to the processor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
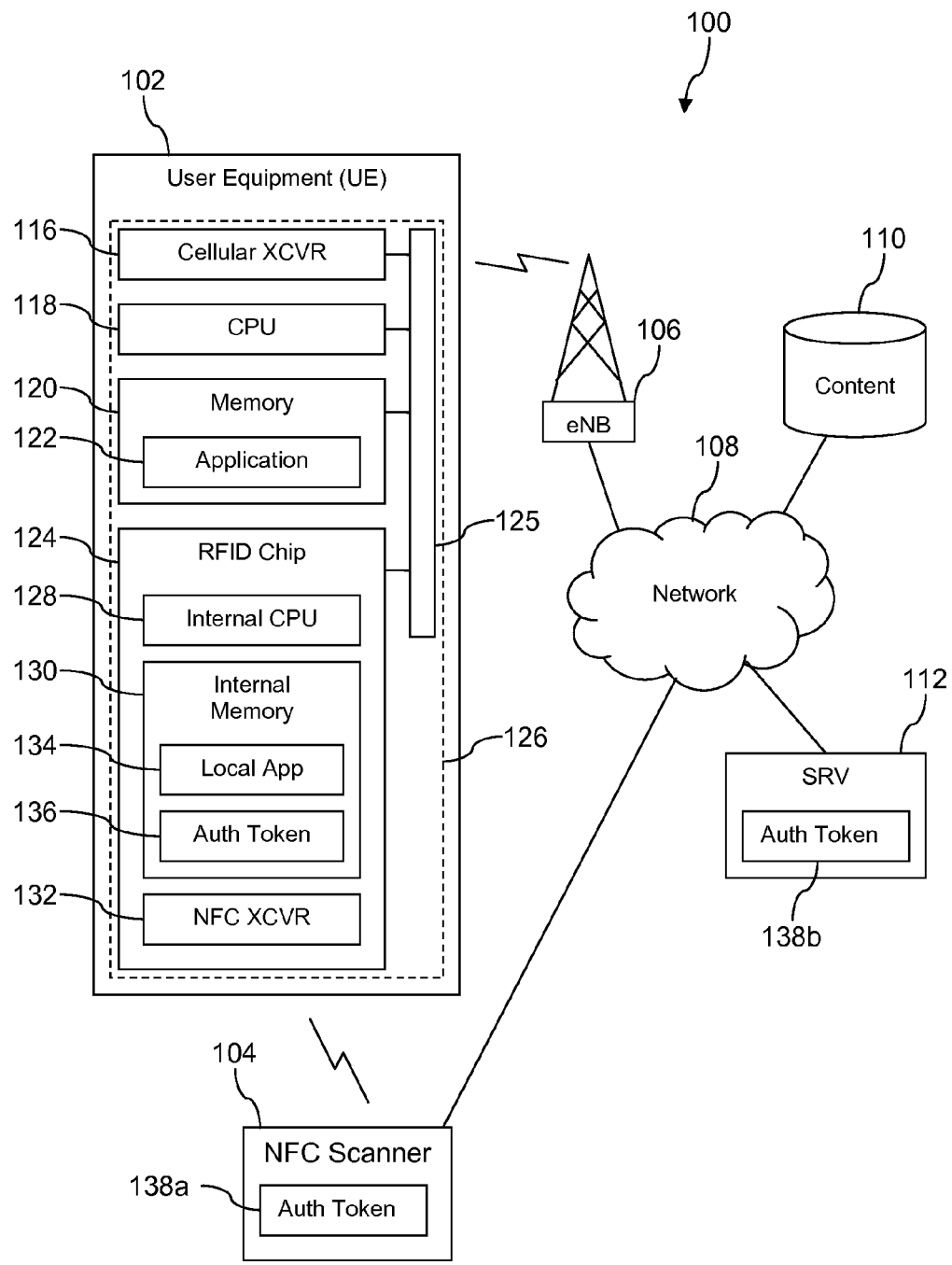
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a radio frequency identity (RFID) chip coupled to the motherboard of a user equipment (UE) or mobile communication device (e.g., a mobile phone or smart phone) that promotes establishment of a virtual private network (VPN) tunnel between the user equipment and a content server or application server. For example, the RFID chip and UE may establish a VPN tunnel to a content server to access privileged video or to a provisioning application server to configure communication service parameters of the UE in a retail store of a wireless communication service provider. The RFID chip may provide an additional authentication factor in the establishment of the VPN tunnel, thereby reducing the risk of loss or expropriation of confidential and/or privileged information.

But this extra authentication factor is inherently linked to a qualifying location, due to the relatively short communication range of the RFID chip and an external reader/writer device that communicates with the RFID chip. Said in another way, the RFID chip introduces the opportunity to qualify the communication link—the VPN tunnel—based on a robust assurance of the current location of the UE. The security bar for deeming a UE as being worthy of extending a VPN tunnel to may be lower if the system can be confident that the UE is located in a specific place, for example in a retail store of a wireless communication service provider. This inherent location qualification may be considered to be a quasi-third authentication factor. Such an inherent location qualification also may be said to be provided by the macro cellular radio transceiver of the UE, but it is to be noted that the location qualification of being in the coverage area of a known enhanced node B (i.e., a cellular tower) is a highly coarse grained location qualification relative to being in the coverage area of a near field communication (NFC) area of a RFID chip.

The RFID chip may receive a request message from a near field communication (NFC) scanner (e.g., a kiosk in a retail store of a wireless communication service provider) via near field communications. The request message requests that the UE to which the RFID chip is coupled establish a VPN tunnel with a destination identified in the request message (e.g., a uniform resource locator (URL) or an Internet protocol (IP) address). The request message further provides an authentication token. The RFID chip communicates with an application executing on a processor of the UE via a communication bus of the UE, communicating the request to open the VPN tunnel, the destination identification, and the authentication token.

The application executing on the processor of the UE communicates with the destination node (e.g., a content server, an application server, a provisioning server, or the like) via a wireless communication link. The wireless communication link may be established using a cellular network or using a short range wireless communication protocol such as WiFi or Bluetooth. The application requests a VPN tunnel from the destination node or from the communication network, providing an identity of the UE and providing the authentication token provided by the NFC scanner (e.g., the kiosk).

The NFC scanner transmits the authentication token via a wired network to the destination node, and the destination node may compare the authentication token received from the UE with the authentication token received from the NFC scanner. If the authentication tokens match, the destination node can conclude that the UE is proximate to the NFC scanner (e.g., proximate to the kiosk and hence within the retail store of the service provider). This may be referred to as a first authentication factor. The destination node may further compare the identity of the UE against a list or data store of UEs that are provisioned to receive service from the service provider. If the UE is determined to be associated with a subscription account in good standing, this may be referred to as a second authentication factor. With the dual factor authentication completed, the destination node may establish the requested VPN tunnel.

In an embodiment, the RFID chip may store a second authentication token locally, in the RFID chip, and may send this second authentication token to the application executing on the UE and to the NFC scanner. The NFC scanner may transmit this second authentication token to the destination node. The destination node may send a second VPN tunnel request to the UE carrying the second authentication token. The application executing on the processor of the UE may compare the second authentication factor provided by the destination node to a local stored copy of the second authentication factor, and if the two authentication factors match, the UE may establish the VPN tunnel requested by the destination node as a second VPN tunnel. The first VPN tunnel may be used for secure communication in one direction between the UE and the destination node while the second VPN tunnel may be used for secure communication in the opposite direction between the UE and the destination node.

It is understood that the scenario described above is only one of a large number of situations that can advantageously employ the two-factor authentication described, for establishing VPN tunnels to promote secure communications or in other situations where two-factor authentication is desired. In an embodiment, the UE may be used by a service technician performing on-premises maintenance on a consumer electronic device, for example a large screen television. The UE of the service technician features an RFID chip as described above that communicates with an NFC radio transceiver (to some extent analogous to the kiosk in the above example). The RFID chip of the UE may send a request to the NFC radio transceiver in the consumer electronic device. In response to receiving the request, the consumer electronic device sends data up to be stored in a cloud storage location along with an authentication token.

The NFC radio transceiver of the consumer electronic device sends the authentication token to the UE of the service technician. The UE of the service technician may then request the information stored in the cloud via an application server mediating access to the stored information, providing the authentication token in this request. The application server compares the authentication tokens, and when they match, retrieves the information from the consumer electronic device stored in the cloud and transmits this information to the UE of the service technician, and the service technician may maintain the consumer electronic device, at least in part, based on the information presented on a display of the UE. After transmitting the information, the application server may delete the information from the cloud storage. The consumer electronic device information may comprise one or more of a history or log of previous maintenance actions performed on the consumer electronic device, an error log or fault log created by the device, user configuration settings of the device, user service subscriptions associated with the device (e.g., premium content services), premium service authentication tokens, a manufacturer identity (e.g., a 'make' or maker of the device), a device model identity, a device serial number, a device software version identity, and the like. Note that the NFC communication, as a result of the communication range limitations inherent in NFC communications, contributes an element of security as the information exchanged over NFC cannot readily be intercepted, for example by devices lurking outside the residence, for example in a car parked on the street outside the residence. While the RFID chip contemplated by the present disclosure may be capable of transmitting and receiving over distances of about 15 feet of less, this range is still largely inconsistent from interception at a distance.

In yet another application of the teachings of the present disclosure, the RFID chip may be embedded in a hard disk memory drive. The hard disk drive may desirably be paired with a unique computer via a wireless communication link. Should the hard disk drive be separated from the paired computer (e.g., the disk drive is left behind, lost, or stolen) it is desirable that the drive not be accessible or interoperable with a different computer. The unique pairing may be established and maintained by a corresponding RFID chip in the computer, or another NFC transceiver peripheral coupled to the computer, where the two RFID chips periodically handshake with each other, for example sharing secret keys. When the handshake does not occur for a threshold period of time, the disk drive may deny requests to read or write the memory of the disk drive. It is understood that the functionality described with reference to a disk memory device is contemplated to be applicable to another form of mass storage device, such as a solid state mass storage device.

Turning now to FIG. 1, a system 100 is described. In an embodiment, the system 100 comprises a user equipment (UE) 102, a near field communication (NFC) scanner 104, an enhanced node B (eNB) 106, a network 108, a content data store (110), and an application server 112. The eNB 106 provides a wireless communication link to the UE 102 according to one or more of a long term evolution (LTE), a code division multiple access (CDMA), a global system for mobile communication (GSM), or a worldwide interoperability for microwave access (WiMAX) wireless communication protocol. In an embodiment, the eNB 106 provides communication coupling to the network 108, via a wireless link to the UE 102 and a wired or wireless link from the eNB 106 to the network 108. The network 108 comprises one or more of a private network, one or more of a public network, or a combination thereof. The UE 102 may be a mobile phone, a smart phone, a media player, a media player, a headset computer, a wearable computer, a laptop computer, a notebook computer, or a tablet computer. It is understood that the system 100 may comprise any number of UEs 102, eNBs 106, NFC scanners 104, content data stores 110, and application servers 112.

In an embodiment, the UE 102 comprises a cellular radio transceiver 116, a processor 118, a memory 120, a radio frequency identity (RFID) chip 124, a communication bus 125, and a motherboard 126. In an embodiment, the UE 102 may comprise a short range radio transceiver (not shown) such as a WiFi radio transceiver and/or a Bluetooth® radio transceiver for establishing wireless communication links with an access point (not shown) and there through to the network 108. The cellular radio transceiver 116, the processor 118, the memory 120, and the RFID chip 124 may communicate with each other via the communication bus 125. The cellular radio transceiver 116, the processor 118, the memory 120, the RFID chip 124, and the communication bus 125 may be mechanically secured by the motherboard 126 and retained within a package (e.g., an exterior) of the UE 102. It is understood that the UE 102 also comprises a user interface such as a touchscreen display and control keys. Other details of an embodiment of a UE are described further hereinafter with reference to FIGS. 4, 5, 6A, and 6B.

The memory 120 may store an application 122 that, when executed by the processor 118, may promote establishment of VPN tunnels and/or performing authentications with remote nodes or hosts, for example to establish a VPN tunnel to the application server 112 and/or to the content data store 110. It is understood that the memory 120 may store a variety of other applications that may be executed by the processor 118, both system applications installed by an original equipment manufacturer (OEM) of the UE 102 as well as user applications installed by a user of the UE 102. System applications may comprise applications such as an email application, a browser application, a contacts directory application, a dialer application (e.g., an application to promote establishing phone calls), a calendar application, and the like. User applications may comprise a streaming media player application, a social networking application, a live news application, and the like.

In an embodiment, the RFID chip 124 comprises an internal processor 128, an internal memory 130, and a near field communication (NFC) transceiver 132. The internal memory 130 may store a local application 134 that promotes mediating between the NFC scanner 104 and the application 122, for example mediating establishment of a VPN tunnel from the UE 102 to the application server 112 and/or to the content data store 110 based on an authentication token received from and in response to a request message received from the NFC scanner 104. In an embodiment, the internal memory 130 further stores at least a second authentication token 136. In an embodiment, the internal memory 130 stores a plurality of "second" authentication tokens, a different "second" authentication token for each of a plurality of independent VPN tunnels that may be supported by the UE 102. In an embodiment, the internal memory 130 may further store an identity of the UE 102, for example a mobile equipment identity (MEID) and/or a phone number associated with the UE 102. In some contexts, the internal processor 128 may be referred to as an RFID internal processor, the NFC transceiver 132 may be referred to as an RFID NFC transceiver, the internal memory 130 may be referred to as an RFID internal memory, and the local application 134 may be referred to as an RFID application.

The NFC transceiver 132 is configured to establish a wireless communication link using NFC communication protocols with an external NFC device, for example the NFC scanner 104, over a range of about fifteen feet or less. In an embodiment, the NFC transceiver 132 is configured to establish a wireless communication link over a range of about five feet or less. In an embodiment, the NFC transceiver 132 is configured to establish a wireless communication link over a range of about two feet or less. The NFC transceiver 132 may conduct wireless communication with one or more antennas internal to the RFID chip 124.

Alternatively, in an embodiment, the NFC transceiver 132 may conduct wireless communication using an antenna external to the RFID chip 124 and located within the UE 102, for example an antenna coupled to the RFID chip 124 via a coupling or connector external to the RFID chip 124. The NFC transceiver 132 may establish wireless communication with other devices, for example with an NFC transceiver that reads from the internal memory 314, possibly subject to successfully completing an authentication handshake. Such an NFC transceiver may read identity, manufacturing, and configuration information stored in the internal memory 314.

The RFID chip 124 is coupled to the motherboard 126 and to the communication bus 125 of the UE 102. In some operation modes, the RFID chip 124 and/or an application executing on the internal processor 128 may provide write access to the internal memory 130 from the communication bus 125, for example a write operation generated by the processor 118. The RFID chip 124 in at least some operation modes receives power from the UE 102, for example from a battery of the UE 102. At the same time, in a passive mode of operation, the RFID chip 124 is operable to extract power from an external radio frequency field, for example when the battery of the UE 102 is not installed (e.g., when the UE 102 is in a retail package before purchase by a user), when the battery of the UE 102 is discharged, or when the UE 102 is turned off. Such a passive mode of operation of the RFID chip 124 may support a variety of useful operations, for example providing identification and state information to maintenance technicians at a refurbishment facility and/or to employees in a fulfillment and/or distribution center. For further details of RFID chips coupled to a mother board of a UE and/or a mobile communication device, see U.S. patent application Ser. No. 13/857,141, filed Apr. 4, 2013, entitled "Digest of Biographical Information for an Electronic Device with Static and Dynamic Portions," by Kevin R. Cordes, et al.; U.S. patent application Ser. No. 13/857,139, filed Apr. 4, 2013, entitled "Radio Frequency Identity (RFID) Chip Electrically and Communicatively Coupled to Motherboard of a Mobile Communication Device," by Kevin R. Cordes, et al.; and U.S. patent application Ser. No. 13/857,138, filed Apr. 4, 2013, entitled "System for Managing a Digest of Biographical Information Stored in a Radio Frequency Identity Chip Coupled to a Mobile Communication Device," by Kevin R. Cordes, et al., each of which is incorporated by reference herein in its entirety.

The NFC scanner 104 may be a component or device that promotes near field communications with NFC transceivers, for example communication with the NFC transceiver 132 of the RFID chip 124. The NFC scanner 104 may comprise both a NFC transceiver as well as a radio frequency power field emitter that may radiate a radio frequency signal suitable for being employed by the RFID chip 124 to induce power in a passive power operation mode (e.g., when not receiving power from the UE 102 and/or from a battery within the UE 102). In an embodiment, the NFC scanner 104 may be embedded within a kiosk or other device. The NFC scanner 104 may be located in a retail store of a mobile communication service provider. The application server 112 may mediate access to content stored in content data store 110. For example, the application server 112 may mediate the opening of one or more VPN tunnels between the UE 102 and the application server 112 and may transmit content to the UE 102 over the VPN tunnel. Alternatively, the application server 112 may provide services to the UE 102 over the one or more VPN tunnels, such as provisioning or premium services.

In an exemplary use case, the NFC scanner 104 may transmit a request message via NFC to the NFC transceiver 132 of the RFID chip 124. The request may comprise a first authentication token, an identity or address of the application server 112 or the content data store 110, and an indication that the UE 102 is requested to establish a VPN tunnel to the identified destination (e.g., the application server 112 or the content data store 110). The internal processor 128 executes the local application 134, and the local application 134 transmits the request, the identity or address of the destination node (e.g., the application server 112 or the content data store 110), and the first authentication token to the application 122 executed by the processor 118. The application 122, based on the information received from the local application 134, requests a VPN tunnel with the application server 112, providing the first authentication token with this request. This may involve establishing a wireless communication link between the cellular radio transceiver 116 and the eNB 106 to the network 108 or establishing a wireless communication link between a short range radio transceiver (not shown) of the UE 102 to an access point (not shown) to the network 108.

The NFC scanner 104 may transmit the first authentication token to the application server 112. Alternatively, the application server 112 may store the first authentication token, either temporarily or indefinitely. In an embodiment, the NFC scanner may create a different authentication token for every request to a UE to open a VPN tunnel, for example treat the first authentication token as a one-time use authentication token. Alternatively, the NFC scanner 104 may periodically create the an authentication token 138a (e.g., once per hour, once per day, once per week, or some other frequency), and the application server 112 may store the authentication token 138b until the NFC scanner 104 sends a message to replace the authentication token with a new first authentication token. When the application server 112 receives the request to establish a VPN tunnel from the application 122 and/or from the UE 102, the application server 112 compares the first authentication token received from the UE 102 to the authentication token 138b received from the NFC scanner 104. If the authentication tokens match, the application server 112 establishes the VPN tunnel. Once the VPN tunnel is established, data, service transactions, or content may be sent over the VPN tunnel.

In an embodiment, the RFID chip 124 and the local application 134 send a second authentication token, for example an authentication token 136 stored in the internal memory 130 of the RFID chip 124, to the NFC scanner 104, an identification of the UE 102 (e.g., a mobile equipment identity and/or a phone number), and a request to open a second VPN tunnel between the UE 102 and the destination node that operates in the sense opposite to the first VPN tunnel. The NFC scanner 104 sends the request, the second authentication token, and the identification of the UE 102 to the destination node (e.g., the application server 112 or the content data store 110). The destination node may then request the UE 102 to establish a VPN tunnel between the UE 102 and the destination node. With two VPN tunnels established data, content, messages, and/or transactions flow from the UE 102 to the destination node on a first of the VPN tunnels and data, content, messages, and/or transactions flow from the destination node to the UE 102 on the second of the VPN tunnels. When the communication session between the UE 102 and the destination node is complete, the VPN tunnel(s) is taken down or closed.

In an embodiment, the UE 102 may promote multiple VPN tunnels at different points in time. To support this capability, the internal memory 130 of the RFID chip 124 may store a plurality of authentication tokens 136, one token for each of the plurality of VPN tunnels. It is appreciated that the VPN tunnels associated with the authentication tokens 136 may be one way VPN tunnels all associated with data, content, message, and/or transaction flowing from a remote node or host to the UE 102.

In an embodiment, a consumer electronic device, for example a large screen television, may use some of the teachings described with reference to FIG. 1. For example, the consumer electronic device may embed a NFC scanner analogous to the NFC scanner 104. A maintenance technician may make a service call to maintain the consumer electronic device and use a wireless communication device in the conduct of that maintenance that is analogous to the UE 102. When the technician begins the service, a NFC transceiver in an RFID chip embedded in the technician's wireless communication device may transmit a request to the NFC scanner of the consumer electronic device. The request may ask the consumer electronic device to transmit information about the device to a storage location in a cloud computing environment. The request may further request that the cloud computing environment or an application server in the cloud computing environment open a VPN tunnel to the wireless communication device of the technician using the authentication token provided in the request by the wireless communication device and then download the information to the wireless communication device. The consumer electronic device information may comprise one or more of a history or log of previous maintenance actions performed on the consumer electronic device, an error log or fault log created by the device, user configuration settings of the device, user service subscriptions associated with the device (e.g., premium content services), premium service authentication tokens, a manufacturer identity (e.g., a 'make' or maker of the device), a device model identity, a device serial number, a device software version identity, and the like.

The wireless communication device of the technician may allow the technician to use the information from the device to perform a maintenance procedure on the device and/or to diagnose a problem experienced by the device. Upon completion of the maintenance activity, the wireless communication device may send an update to the consumer electronic device, for example a record or log of what maintenance was performed, a time and date the maintenance was performed, and the like.

Figure 2:
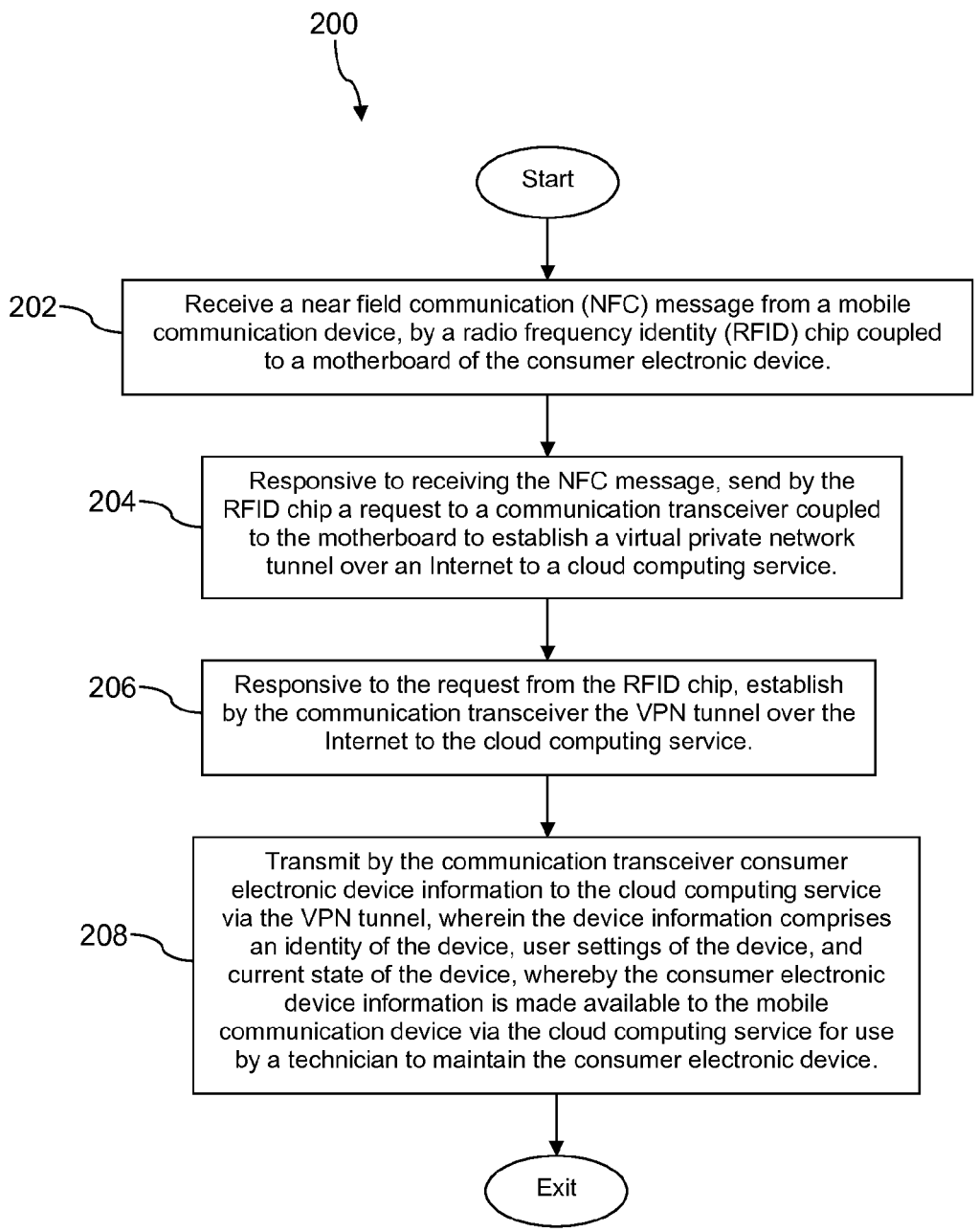
FIG. 2 is a flow chart of a method according to an embodiment of the disclosure.
Figure 3:
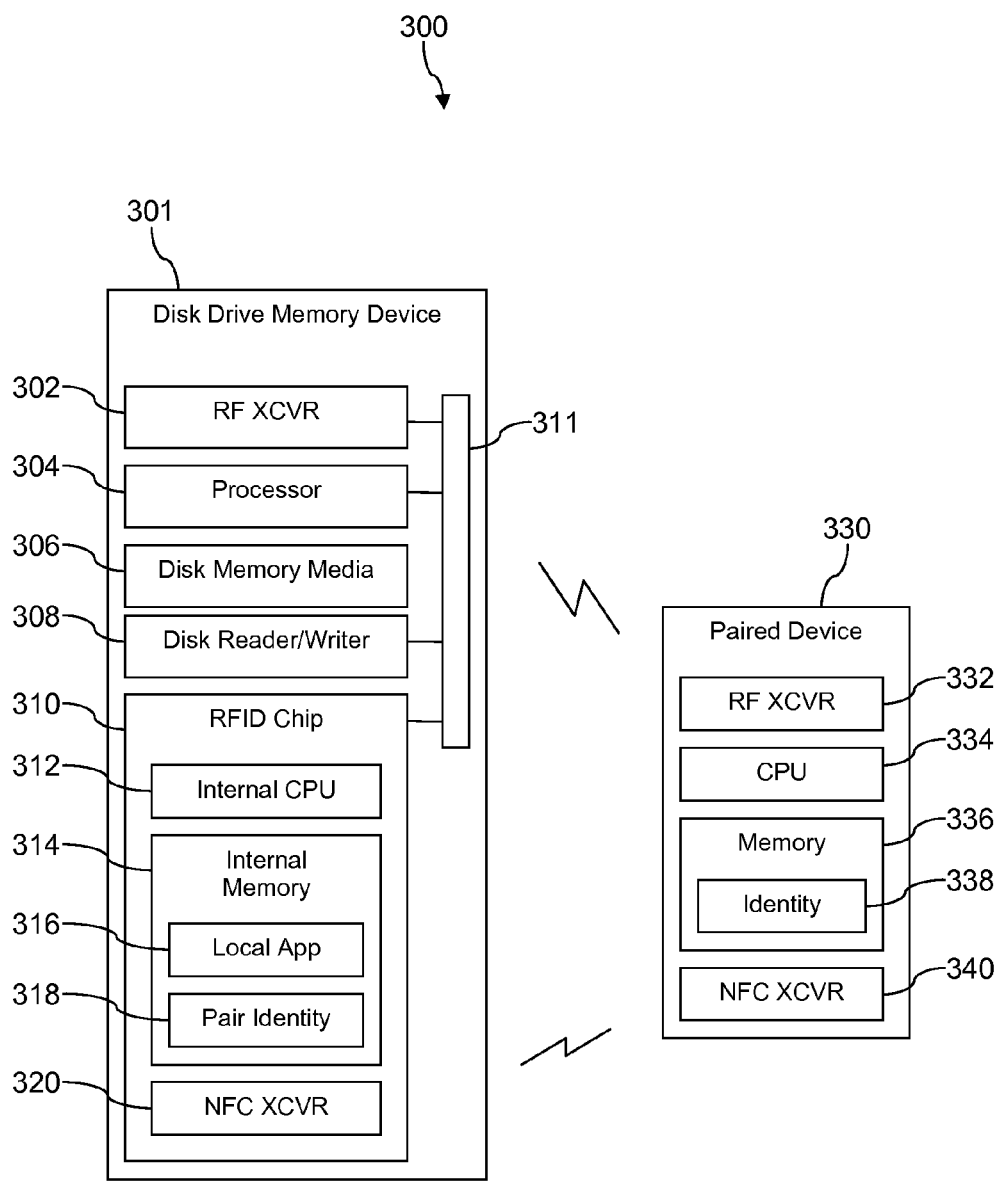
FIG. 3 is a block diagram of a disk drive memory device according to an embodiment of the disclosure.

Turning now to FIG. 2, a method 200 is described. At block 202, receive a near field communication (NFC) message from a mobile communication device, by a radio frequency identity (RFID) chip coupled to a motherboard of the consumer electronic device. At block 204, responsive to receiving the NFC message, send by the RFID chip a request to a communication transceiver coupled to the motherboard to establish a virtual private network tunnel over an Internet to a cloud computing service. At block 206, responsive to the request from the RFID chip, establish by the communication transceiver the VPN tunnel over the Internet to the cloud computing service. At block 208, transmit by the communication transceiver consumer electronic device information to the cloud computing service via the VPN tunnel, wherein the device information comprises an identity of the device, user settings of the device, and current state of the device, whereby the consumer electronic device information is made available to the mobile communication device via the cloud computing service for use by a technician to maintain the consumer electronic device Turning now to FIG. 3, a system 300 is described. In an embodiment, the system 300 comprises a disk drive memory device 301 and a paired device 330. In embodiment, the disk drive memory device 301 comprises a radio frequency transceiver 302, a processor 304, a disk memory media 306, a disk reader/writer 308, a radio frequency identity (RFID) chip 310, and a communication bus 311. The disk memory media 306 may be a rotating memory disk. The memory disk may be an optical media or a magnetic media. The disk reader/writer 308 may be referred to in some contexts as an electromechanical disk reader. The radio frequency transceiver 302 may be a short range radio transceiver configured for transmitting and receiving over relatively short distances, for example less than 500 feet, less than 100 feet, or less than 10 feet. In an embodiment, the radio frequency transceiver 302 is a WiFi transceiver, a Bluetooth® transceiver, or an industrial, scientific, and medical (ISM) radio band transceiver. The RFID chip 310 comprises an internal processor 312, an internal memory 314, and a near field communication (NFC) transceiver 320. The internal memory 314 comprises a local application 316 and a pair identity 318. The radio frequency transceiver 302, the processor 304, the disk read/writer 308, and the RFID chip 310 communicate with each other, as needed, via the communication bus 311.

In an embodiment, the RFID chip 310 may receive power from the disk drive memory device 301 in some operation modes, for example from a battery (not shown) or from a power supply (not shown) of the disk drive memory device 301. The RFID chip 310 is further configured to operate in a passive power mode where it derives electrical power from an incident radio frequency field. The passive power mode may provide a number of advantageous functions. For example, the disk drive memory device 301 may be read, via the RFID chip 310, in a maintenance facility or a distribution facility to determine a state of the disk drive memory device 301 or to determine other information about the disk drive memory device 301. The disk drive memory device 301 may have the pair identity 318 transmitted to the RFID chip 310 and stored in the pair identity 318 of the internal memory 314 during a passive power mode.

In one mode of operation, subject to an authentication process described below, the radio frequency transceiver 302 receives a request from the radio frequency transceiver 332 of the paired device 330 to read or write the disk memory media 306. The processor 304 generates a read or write request, sends this request over the communication bus 311 to the disk reader/writer 308, and the disk reader/writer 308 writes data to or reads data from the disk memory media 306 responsive to the request from the processor 304. If the request is a read request, the disk reader/writer 308 sends the read data to the processor 304, the processor 304 sends the data to the radio frequency transceiver 302, and the radio frequency transceiver 302 transmits the data wirelessly to the radio frequency transceiver 332 of the paired device 330.

The system 300 represents an association between the disk drive memory device 301 and the paired device 330. In an embodiment, the disk drive memory device 301 is physically separate from or separable from (e.g., separable by disconnecting a communication cable or dongle). The disk drive memory device 301 is intended to support operations of the paired device 330 and store data, access to which may desirably be restricted to the paired device 330. The disk drive memory device 301 may be, for example, an expansion memory device associated with the paired device 330.

The paired device 330 may be a laptop computer, a desktop computer, a tablet computer, a notebook computer, a headset computer, a wearable computer, or a mobile phone. In an embodiment, the paired device 330 comprises a radio frequency transceiver 332, a processor 334, a memory 336 storing an identity of the paired device 330, and an NFC transceiver 340. The radio frequency transceiver 332 may be a short range radio transceiver configured for transmitting and receiving over relatively short distances, for example less than 500 feet, less than 100 feet, or less than 10 feet. In an embodiment, the radio frequency transceiver 302 is a WiFi transceiver, a Bluetooth® transceiver, or an industrial, scientific, and medical (ISM) radio band transceiver.

The NFC transceiver 320 periodically challenges the NFC transceiver 340 of the paired device 330 to return the identity 338 of the paired device 330 stored in the memory 336. When the identity returned by the NFC transceiver 340 matches the pair identity 318 stored in the internal memory 314 of the RFID chip 310, the disk drive memory device 301 continues to provide access to the disk memory media 306 via the radio frequency transceiver 302. When the identity returned to the NFC transceiver 320 of the RFID chip 310 does not match the pair identity 318 or if no identity is returned to the NFC transceiver 320, access to the disk memory media 306 may be suspended. For example, in an event of a failed comparison, the local application 316 may communicate via the communication bus 311 with an application executing on the processor 304, and that application executing on the processor 304 may refuse authorized access to the disk memory media 306 via the radio frequency transceiver 302. This may be referred to as sending an authorization denial from the RFID chip 310 and/or from the local application 316 to the processor 304.

In an embodiment, the RFID chip 310 sends the identity 338 of the paired device 330 or the pair identity 318 stored in the internal memory 314 to the processor 304, and the processor 304 compares the identity 318/338 with a corresponding identity presented in the memory read/write request from the paired device 330 received via the radio frequency transceiver 302. The processor 304 compares the identities and in the event of match allows the access and in the event of mismatch, disallows the access. In an embodiment, the functionality described above with reference to FIG. 3 may be advantageously extended to a solid state (i.e., semiconductor based) mass memory device. In such a solid state memory device, the disk drive memory device 301 may be substituted for by a memory device. The memory device may comprise a memory media in the place of the disk memory media 306, a memory reader/writer in the place of the disk reader/writer 308. In some contexts, the memory reader/writer may be referred to solely as a memory reader, for example when the reader function is referred to.

Figure 4:
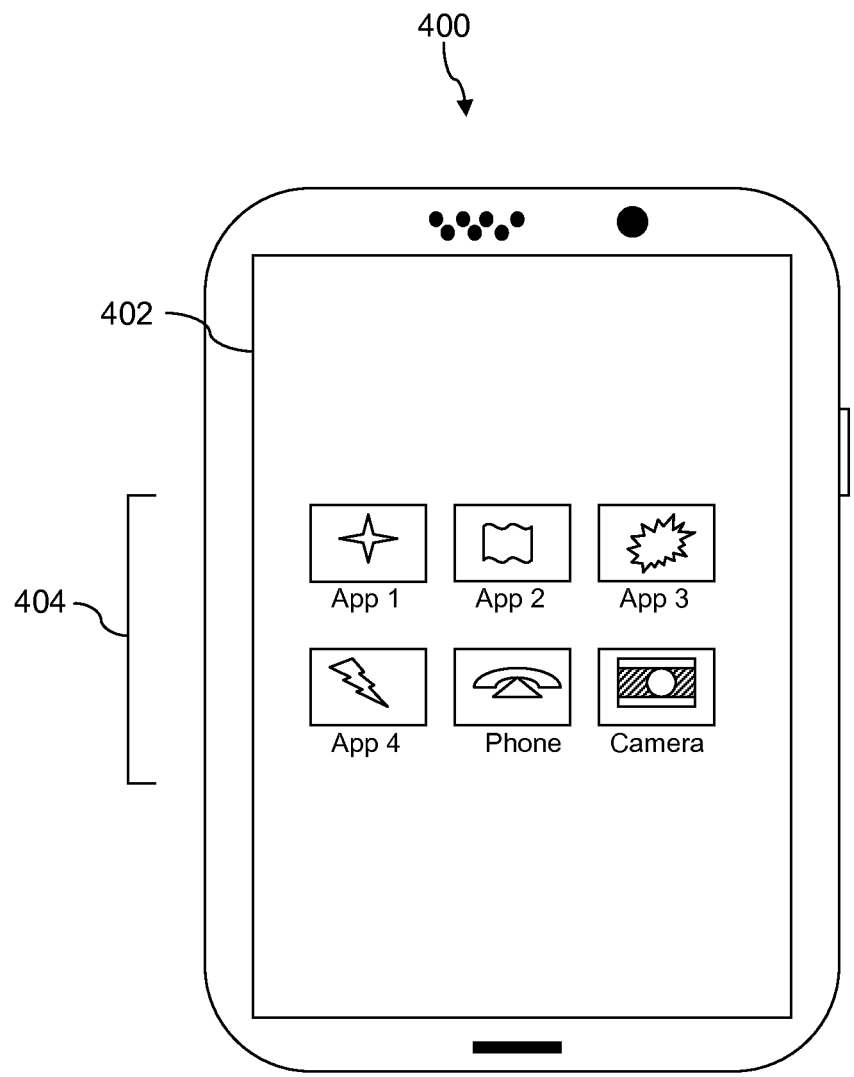
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
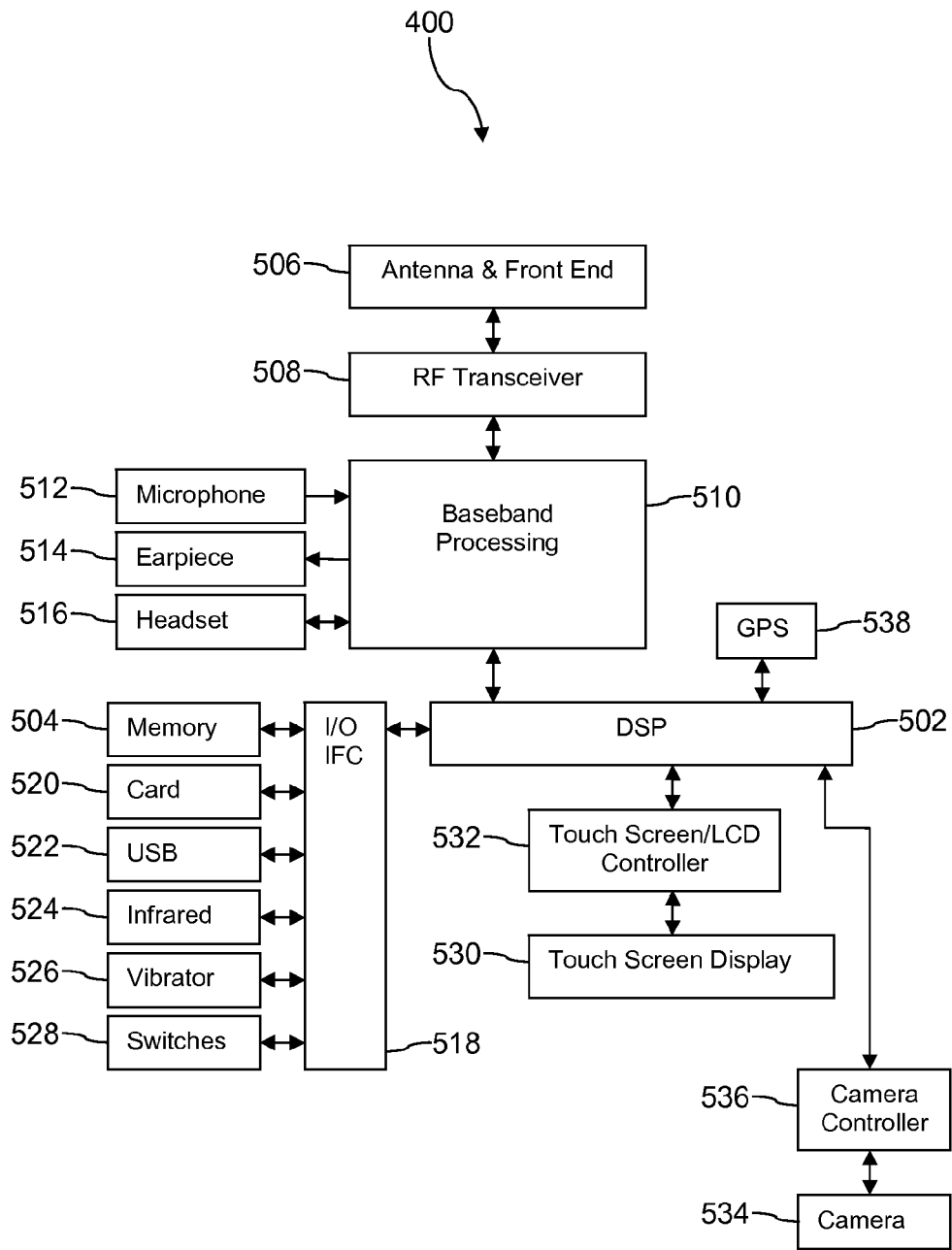
FIG. 5 is a block diagram of a hardware architecture for a UE according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
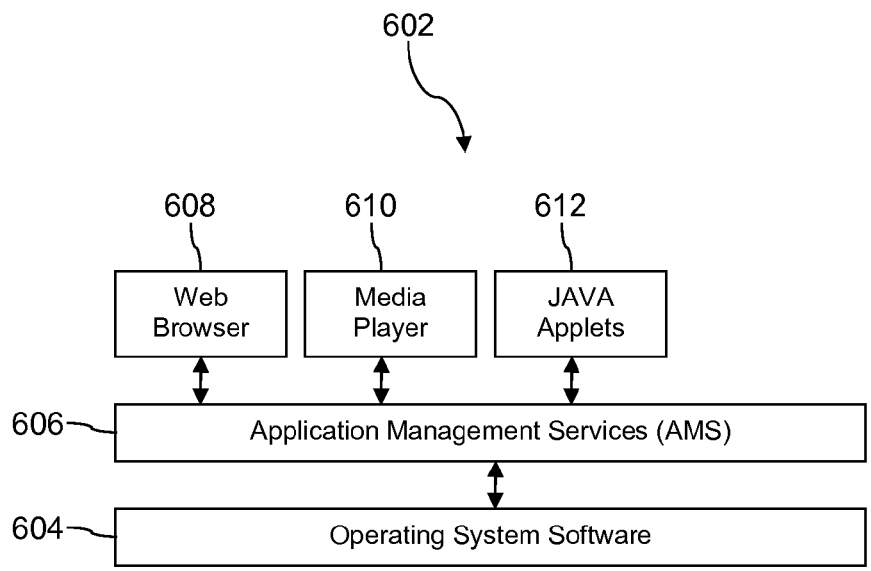
FIG. 6A is a block diagram of a software architecture for a UE according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
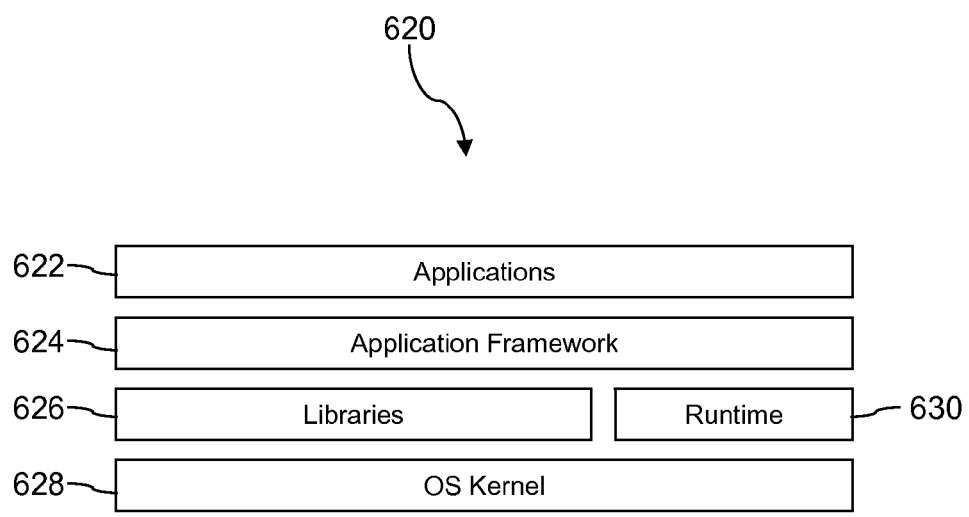
FIG. 6B is a block diagram of another software architecture for a UE according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
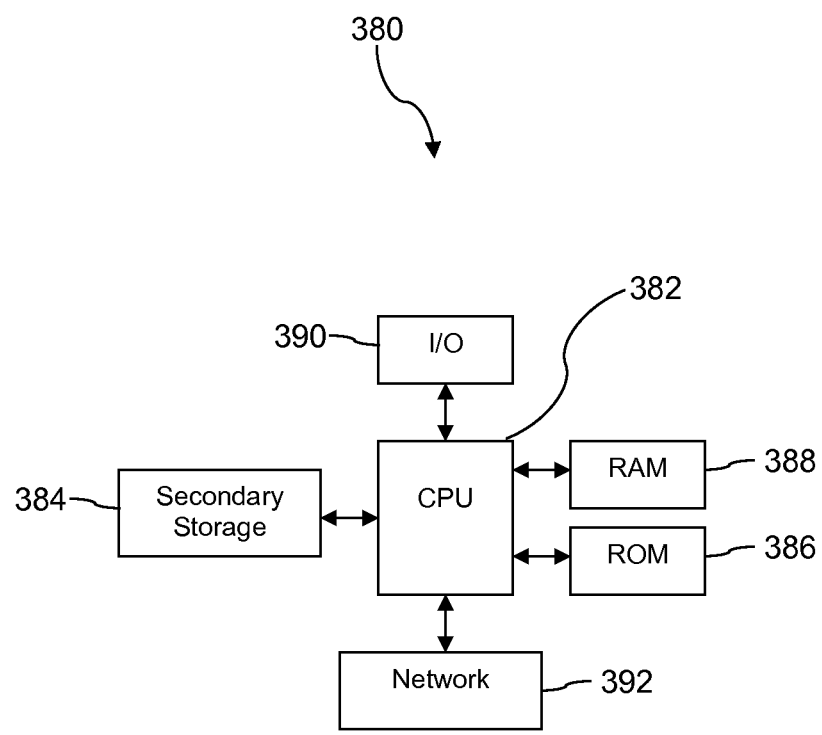
FIG. 7 is a block diagram of a computer system according to an embodiment of the disclosure.

FIG. 7 illustrates a computer system 380 suitable for implementing one or more embodiments disclosed herein.

For example, the application server 112 may be implemented as a computer system. The content data store 110 may be implemented as or may be accessed via a computer system. The NFC scanner 104 may be implemented as a computer system. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:
    a motherboard comprising a communication bus;
    a cellular radio frequency transceiver connected to the communication bus of the motherboard;
    a processor connected to the communication bus of the motherboard;
    a radio frequency identity (RFID) chip connected to the communication bus of the motherboard, wherein the RFID chip comprises an RFID near field communication (NFC) transceiver, an RFID internal processor, an RFID internal memory, and an RFID application stored in the RFID internal memory, wherein the RFID chip provides wireless read access to the RFID internal memory and provides write access to the RFID internal memory to the communication bus of the motherboard;
    a memory connected to the communication bus of the motherboard; and
    an application stored in the memory that, when executed by the processor, receives a request from the RFID chip to establish a virtual private network (VPN) tunnel via the cellular radio frequency transceiver based on information encapsulated in the request,
    wherein the RFID application, when executed by the RFID internal processor,
        receives a message from an NFC device via the RFID NFC transceiver, wherein the message comprises a command to open the VPN tunnel and an authentication token, and
        responsive to receiving the message from the RFID NFC transceiver, sends the request to establish the VPN tunnel to the application executed on the processor, and
    wherein the request sent from the RFID chip to the application executed on the processor further comprises the authentication token, and the VPN tunnel is established based on the authentication token.

2. The UE of claim 1, wherein the cellular radio frequency transceiver is operable to communicate according to one or more of a long term evolution (LTE), a code division multiple access (CDMA), a global system for mobile communication (GSM), or a worldwide interoperability for microwave access (WiMAX) wireless communication protocol.

3. The UE of claim 1, wherein the internal memory of the RFID chip stores an identity of the UE and responsive to receiving the message from the NFC device, the RFID NFC transceiver transmits the identity stored in the RFID internal memory to the NFC device.

4. The UE of claim 1, wherein responsive to receiving the message from the NFC device, the RFID NFC transceiver transmits a second authentication token to the NFC device, whereby a second VPN tunnel is established to the UE based on the second authentication token.

5. The UE of claim 1, wherein the VPN tunnel is established with a content server of a wireless communication service provider and content is received by the UE via the VPN tunnel from the content server.

6. The UE of claim 1, wherein the NFC device is a kiosk in a retail store of a wireless communication service provider which provides cellular communication service to the UE.

7. A method of servicing a consumer electronic device, comprising:
    receiving, by a radio frequency identity (RFID) chip coupled to a motherboard of the consumer electronic device, a near field communication (NFC) message from a mobile communication device;
    responsive to receiving the NFC message, sending, by the RFID chip, a request to a communication transceiver coupled to the motherboard to establish a virtual private network (VPN) tunnel over an Internet to a cloud computing service;
    responsive to the request from the RFID chip, establishing, by the communication transceiver, the VPN tunnel over the Internet to the cloud computing service;
    transmitting, by the communication transceiver, consumer electronic device information and an authentication token to the cloud computing service via the VPN tunnel, wherein the consumer electronic device information comprises an identity of the consumer electronic device, user settings of the consumer electronic device, and current state of the consumer electronic device; and
    transmitting, by the consumer electronic device, an authentication token to the mobile communication device, wherein the mobile communication device includes the authentication token in a request for the consumer electronic device information and sends the request for the consumer electronic device information to an application server, and wherein the application server compares the authentication token from the consumer electronic device and the authentication token in the request for the consumer electronic device information from the mobile communication device and when they match, transmits the consumer electronic device information to the mobile communication device, whereby the consumer electronic device information is made available to the mobile communication device via the cloud computing service for use by a technician to maintain the consumer electronic device.

8. The method of claim 7, wherein the consumer electronic device is a big screen television.

9. The method of claim 7, wherein the consumer electronic device information comprises authorization tokens for accessing premium services via the consumer electronic device.

10. The method of claim 7, wherein the identity of the consumer electronic device comprises a make and model of the consumer electronic device.

11. The method of claim 10, wherein the consumer electronic device information comprises a serial number of the consumer electronic device.

12. The method of claim 11, wherein the consumer electronic device information comprises a device fault log.

13. The method of claim 11, wherein the consumer electronic device information comprises a log of maintenance actions performed on the consumer electronic device.

14. A memory device, comprising:
a memory media;
a communication bus;
a memory reader communicatively coupled to the communication bus;
a radio frequency transceiver coupled to the communication bus;
a radio frequency identity (RFID) chip coupled to the communication bus wherein the RFID chip comprises an RFID near field communication (NFC) transceiver, an RFID internal processor, an RFID internal memory, and an RFID application stored in the RFID internal memory, wherein the RFID internal memory stores an identity of a paired computing device; and
a processor coupled to the communication bus operable to receive a request to read data from the memory media from the radio frequency transceiver, to request authorization from the RFID chip, to read data from the memory media via the memory reader, and to transmit the read data via the radio frequency transceiver, wherein the RFID application when executed by the RFID internal processor receives an identity from an external device, compares the identity of the external device to the identity of the paired computing device stored in the RFID internal memory, and responsive to agreement between the identity of the external device and the identity of the paired computing device stored in the RFID internal memory and responsive to the authorization request from the processor, sends authorization to the processor, and wherein responsive to receiving the authorization, the processor transmits the read data via the radio transceiver based on the agreement between the identity of the external device and the identity of the paired computing device stored in the RFID internal memory.

15. The device of claim 14, wherein when the RFID application does not receive an identity from an external device, the RFID application sends authorization denial to the processor.

16. The device of claim 14, wherein the RFID application periodically queries the external device to transmit an identity to the RFID chip.

17. The device of claim 14, wherein the RFID chip has a NFC reception range of about 5 feet.

18. The device of claim 14, wherein the paired computing device is one of a laptop computer, a tablet computer, a notebook computer, a headset computer, or a wearable computer.

19. The device of claim 14, wherein the request to read data comprises an identity, the RFID chip sends the identity of the external device in the authorization to the processor, and the processor compares the identity in the request to read data to the identity in the authorization, and wherein the processor transmits the read data via the radio frequency transceiver based on the identities matching.

* * * * *